Jan. 19, 1937.   W. A. ABEGG   2,068,218
ROTARY TABLE BUSHING
Filed April 4, 1936   2 Sheets-Sheet 1

Inventor
Walter A. Abegg.

Attorney.

Jan. 19, 1937.  W. A. ABEGG  2,068,218
ROTARY TABLE BUSHING
Filed April 4, 1936   2 Sheets-Sheet 2
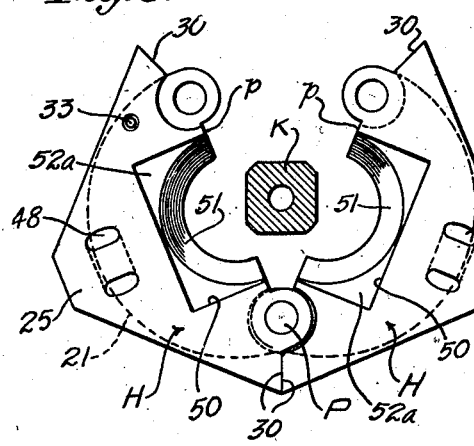
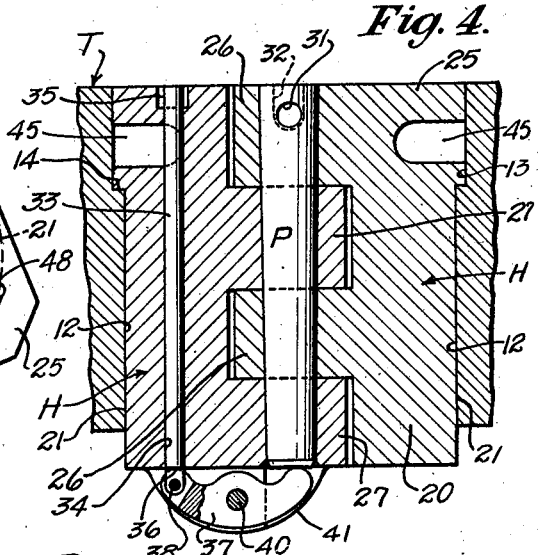
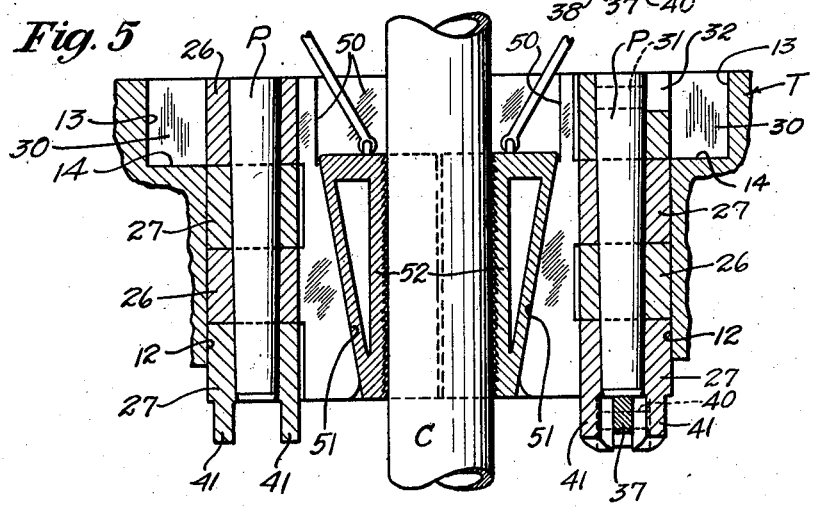
Inventor
Walter A. Abegg.
Attorney.

Patented Jan. 19, 1937

2,068,218

UNITED STATES PATENT OFFICE 2,068,218

ROTARY TABLE BUSHING

Walter A. Abegg, Los Angeles, Calif., assignor of one-half to B. Reinhold, Los Angeles, Calif.

Application April 4, 1936, Serial No. 72,746

14 Claims. (Cl. 255—23)

This invention has to do with the bushings, commonly known as table bushings or master bushings, used in the rotary tables of rotary drilling rigs. This application is a continuation in part of application Serial No. 36,847 on Automatic drilling spiders, filed August 19th, 1935.

A brief description of the ordinary functions of such bushings will facilitate an understanding of the improvements provided by this invention. The table, rotated by applied power in a horizontal plane, has a central bushing receiving opening which, although not limited to any particular configuration, commonly is cylindric in its lower part, square in its upper part, and with an upwardly facing shoulder between the cylindric and square parts. This opening, usually of substantially larger size than the drill pipe being used, receives the set of table bushings which in turn receives the set of pipe engaging bushings. The latter, the pipe engaging bushings, may either be of the type known as slips, which are employed for supporting pipe, or may be of the type known as driving or "kelly" bushings which were employed to engage the usually square "kelly".

Both sets of bushings are commonly made in a plurality of sections; the table bushings usually in two sections, the rotary driving bushings usually in two sections (though sometimes the driving bushing is of one-piece construction) and the pipe supporting bushings or slips commonly in two or more sections. Due to the wedging action of the pipe supporting slips a heavy outward pressure is placed upon the table bushings when pipe is being supported, this pressure being transmitted through said bushings to the rotary table. When the pipe driving bushings are in use reactive forces involved in the driving torque put spreading pressures upon the table bushings, these pressures likewise being transmitted to and withstood by the rotary table. In such cases, and particularly when using the pipe supported slips, the surfaces of the central table opening are subjected to heavy pressures and therefore to constant wear.

It is one of the objects of the present invention to provide a table or master bushing construction in which such spreading forces are taken up within the bushing itself, so that spreading forces are not transmitted to the table, and so that wear on the table surfaces under the heavy pressures otherwise imposed is eliminated.

Other objects, such as those having to do with organizing the parts into a unitary bushing that can be handled as a unit, and providing for hinged connection between the bushing parts, will be understood from what follows.

Although my improved bushing may be made up of any suitable number of bushing parts, I prefer to make it up of two bushing parts so that, when the parts are interconnected by spaced pin connections, the bushing as a whole will be rigid. In the bushing thus made up of two parts, each of which is rigid, those two parts are then, in accordance with my invention, interconnected by pin connections of such a nature that either pin connection, if the other is withdrawn, may act as a hinge. Thus in a bushing so built up there inhere both the advantage of a bushing which, as a whole, is rigid, and the advantage of being readily transformable into a hinged construction that, although still having its parts interconnected, can be opened for placement about a pipe or the like.

Also, although the preferred two bushing parts need not be duplicates, I prefer to make up the complete bushing of two duplicate halves. Accordingly, in the following specific description, but without limitation upon the invention itself, I shall describe a practically preferred form of the invention as illustratively embodied in a table or master bushing made up of two duplicate or symmetric bushing halves.

For the purpose of such description reference is had to the accompanying drawings in which:

Fig. 3 is a plan of the table bushing itself, showing it with one of the interconnection pins removed and the parts opened up on the other pin acting as a hinge;

Fig. 4 is an enlarged detail section on line 4—4 of Fig. 1; and

Fig. 5 is a vertical section taken as indicated by line 5—5 of Fig. 1, but showing pipe supporting bushings or slips applied to the table bushing.

Figure 1:
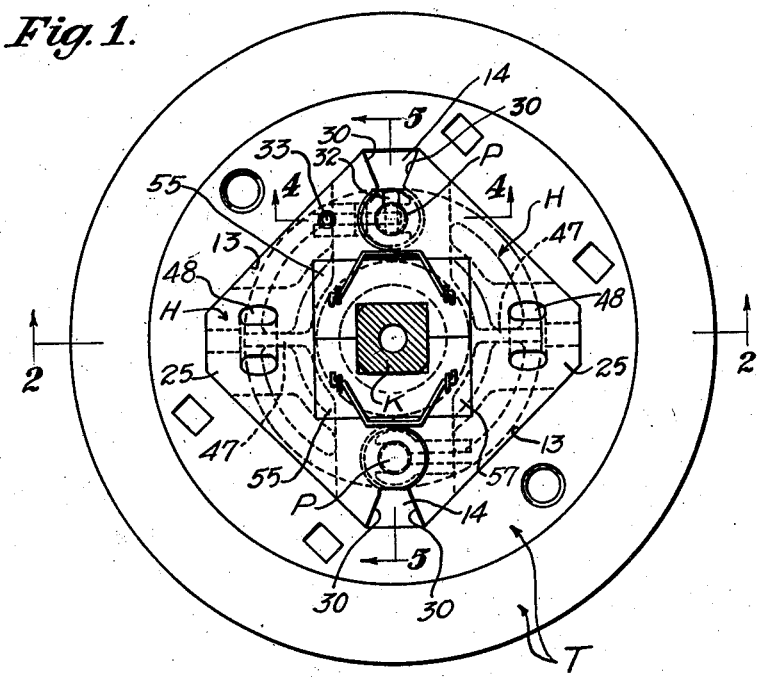
Fig. 1 is a plan showing my improved bushing as it appears in use applied to a rotary table, and with rotary drive bushings installed in the table bushing.
Figure 2:
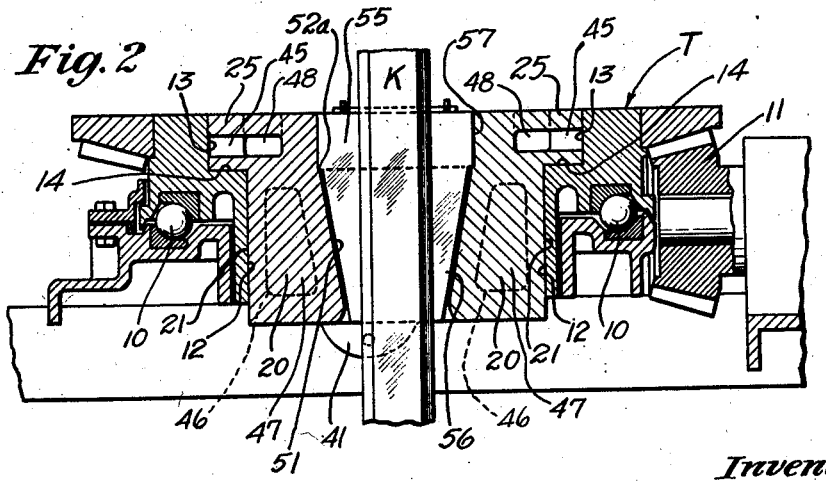
Fig. 2 is a vertical section taken as indicated by line 2—2 on Fig. 1.

In the drawings, Figs. 1 and 2, a typical rotary table T is shown, mounted on bearings 10 and driven by gear 11. This table typically has a central opening whose lower part 12 is cylindric, and upper part 13 substantially square, the corners of the square being relieved, as shown in the plan of Fig. 1. The square upper part 13 of the table opening is large enough that an upwardly facing shoulder 14 lies between the parts 12 and 13. This shoulder 14 may or may not be annular or continuous around the opening. It is this shoulder which affords support for the master or table bushing.

My improved table bushing, in the specific preferred form here being described, comprises two duplicate halves H adapted to be secured together by the two pins P, the pins preferably, though not necessarily, being tapered. Each bushing half has a lower portion 20, the exterior surface of which is substantially semi-cylindric, as indicated at 21; and when the two bushing halves are pinned together, these two lower portions form a substantially cylindric lower bushing assembly adapted to fit fairly tightly, but yet freely, into the lower cylindric portion 12 of the table opening.

The upper portion of each bushing half is in half-square formation; so that the assembled bushing halves, considered as a unit, have an upper portion which is substantially of square formation—a portion which may otherwise be described as being in the nature of a square flange on the upper end of the cylindric portion of the assembled bushing unit. Thus, this upper formation on each of the bushing halves may be described as being a half-square flange which is generally designated by the numeral 25; and the lower, downwardly facing surface of this square flange is adapted to seat on the upwardly facing shoulder 14 of the table while the flange-square itself fits fairly closely, but yet freely, into the square opening 13 of the table. The plane of separation of the two bushing halves, indicated by $p$ in Fig. 3, and coinciding generally with the section line 5—5 on Fig. 1, is on a diagonal of the square.

Near what may be termed the joining ends of the two segmental bushing halves, they are interconnected by the taper pin P. As more particularly shown in the detail of Fig. 4, the two halves H have interfitting projections or hinge lugs 26 and 27, taper-bored for the reception of the taper pins P which fit all of the lugs tightly.

Outside the pin connections the two bushing halves are relieved, as at 30, so that when one of the pins P is removed the two bushing halves can be opened up to such a spread as is indicated in Fig. 3. Either of the pins P may be thus used as a hinge pin when the other pin is withdrawn. It is immaterial which pin P is used as a hinge. Both the pins P are preferably removable, so that the bushing halves may be separated if desired. I preferably make provision for easily and readily removing one of the pins so that in practice the other becomes the one that acts as a hinge pin.

Thus, the pin P that is shown in Fig. 4 (the one appearing at the right in Fig. 5 and at the top of the drawing in Fig. 1) is provided at its upper end with a transverse hole 31 adapted for the insertion of any suitable tool; and the mounting of the bushing is relieved adjacent the hole 31, as best indicated at 32 in Figs. 4 and 5. To initially lift and loosen this taper pin P, I provide a vertical drive pin 33 mounted in a suitable vertical bore 34 in one of the bushing halves. The upper end of this drive pin lies in an enlarged counter bore 35, flush with the upper surface of the bushing. The lower end of the drive pin bears, as at 36, upon one end of a centrally pivoted lever 37, the other end of this lever lying directly under the lower end of the taper pin P. The lower end of drive pin 33 is also pinned, as at 38, to the lever 37 to prevent accidental displacement of drive pin 33 from its bore. The lever pivot 40 is supported by a lug or lugs 41 depending from the lower surface of the bushing half.

It will be readily understood how this one tapered pin may easily and readily be removed by first starting it by driving on the drive pin 33 and then lifting it out with any suitable implement. And the pin may thus be easily removed even though it does fit tightly. It is intended that these tapered connection pins P fit the two bushing halves accurately and tightly, providing a rigid interconnection between the bushing halves. For that purpose the pins are carefully fitted into their tapered bores, and the taper is rather slight so that the pins will drop into close fit.

Other structural features of my improved bushing need only a cursory explanation. The upper or square portions of the bushing halves are recessed, as at 45, and the lower portions are internally cored out, as at 46, to lighten the construction. This internal coring leaves ribs, as shown at 47 in dotted lines in Fig. 1, and as shown in full section in Fig. 2, to give the bushing halves the requisite strength. In the upper faces of the two bushing halves I provide the usual hook holes 48 to facilitate engaging and lifting the bushings.

The internal opening in the table bushing may be of any desired form and commonly will be of the standard form embodying an upper square opening portion 50 and a lower tapered conical portion 51, with an upwardly facing shoulder 52a between the two portions. As in usual practice, the pipe supporting bushing or wedge slips, as shown at 52 in Fig. 5, fit into the lower conical tapered portion 51 of the opening in the table bushing. These slips, riding down the tapered surfaces of openings 51, which surfaces are preferably especially hardened, wedgingly grip a pipe or casing, such as shown at C; and the lateral, or horizontal, forces involved in this wedge gripping action are in some cases very large. These lateral forces are of course transmitted to the halves of the table bushing; and, were it not for the pin interconnection between those halves would then be transmitted through those halves to the table itself. Closely fitting pins P, however, not only hold the bushing halves in perfect alinement, but also take those lateral forces or spreading pressures, and thus prevent those pressures from being imposed upon the rotary table.

Bushings for rotationally driving the rotary pipe, or kelly K such as is shown in Figs. 1 and 2, are usually of the form shown at 55 in those figures. Commonly two such driving bushings are employed (though one-piece drive bushings are sometimes used) each having a tapered lowered portion 56 which somewhat loosely fits the lowered tapered portion 51 of the table bushing opening, and an upper rectangular portion 57. These two upper rectangular portions 57 make up together a square which fits the square upper portion 50 of the table bushing opening. The internal opening in these drive bushings 55 is square to fit the usually square kelly K.

The reactive forces engendered by the driving torque applied by bushings 55 to the kelly tend to radially spread the bushings 55; and likewise either that spreading tendency or the spreading tendency accompanying the transmission of driving torque from the table bushing to the bushings 55 tends to spread the halves of the table bushings. Normally these spreading forces cause pressures upon the table itself, and, as in the case where supporting slips are being used, these pressures cause wear of the table surfaces. But here again, as before, the tightly fitting interconnecting pins P hold the two bushing halves H together as a rigid whole, preventing spreading, and thus preventing those lateral spreading pressures from being applied to the table.

The spreading tendency will accompany the transmission of driving torque whether the drive bushing be sectional or one-piece, and the remedy noted above is equally effective in either case. Therefore, the showing of a sectional drive bushing is in no way to be considered as limitative on the invention considered in its broader aspects.

I have noted that the form here described, embodying two substantially duplicate or symmetric table bushing parts, is merely typical; that the invention may be applied to a table bushing of more than two parts and that the parts need not be duplicates. The term "complementary" is used in the following claims merely in the sense that the several parts make up the whole unitary bushing structure.

I claim:

1. A rotary table bushing, comprising a pair of complementary rigid bushing parts forming a unitary bushing adapted exteriorly to fit a rotary table and interiorly to take pipe engaging bushings, and means to interconnect the bushing parts, said means comprising interengaging formations on each of the end portions of the bushing parts, and downwardly pointing tapered pins fitting complementary registering pin holes in said formations to interconnect the parts.

2. A rotary table bushing, comprising a pair of complementary rigid bushing parts forming a unitary bushing adapted exteriorly to fit a rotary table and interiorly to take pipe engaging bushings, and means to interconnect the bushing parts, said means comprising interengaging formations on each of the end portions of the bushing parts, and downwardly pointing tapered pins fitting complementary registering pin holes in said formations to interconnect the parts; one of said pin interconnections when acting alone forming a hinge connection between the bushing parts allowing the parts to be swung apart when the other pin is removed.

3. A rotary table bushing, comprising a pair of complementary rigid bushing parts forming a unitary annular bushing adapted exteriorly to fit a rotary table and interiorly to take pipe engaging members, each of said parts forming a segment of the complete bushing annulus and joining the other part at its segmental ends, and means interconnecting the joining ends of the segmental parts, said means including interengaging formations on said joining ends provided with registering tapered bores, tapered pins closely fitting said bores, one of said pins being removable, and means carried by one of the bushing parts adapted for forcing the removable pin for removal.

4. A rotary table bushing, comprising a plurality of complementary rigid bushing parts forming a unitary bushing adapted exteriorly to fit a rotary table and interiorly to take pipe engaging members, means including a plurality of spaced hinge pins adapted rigidly to interconnect the bushing parts directly so that pressures due to spreading forces applied to the bushing parts are not applied to the rotary table, and means carried by one of the bushing parts adapted for forcing one of said pins for removal.

5. A rotary table bushing, comprising a pair of complementary rigid bushing parts forming a unitary bushing adapted exteriorly to fit a rotary table and interiorly to take pipe engaging members, and means to interconnect the bushing parts, said means comprising interengaging formations on each of the end portions of the bushing parts, registering pin holes in said parts, pins fitting said holes to interconnect the parts; one of said pin interconnections when acting alone forming a hinge connection between the bushing parts allowing the parts to be swung apart when the other pin is removed, and means carried by one of the bushing parts adapted for forcing one of said pins for removal.

6. A rotary table bushing, comprising a pair of complementary rigid bushing parts forming a unitary bushing adapted exteriorly to fit a rotary table and interiorly to take pipe engaging members, and means to interconnect the bushing parts, said means comprising interengaging formations on each of the end portions of the bushing parts, registering tapered pin holes in said parts, tapered pins fitting said holes to interconnect the parts, and means carried by one of the bushing parts adapted for forcing the removable pin for removal.

7. In a rotary table bushing adapted to be moved vertically into and out of the central opening of a rotary table, a plurality of complementary rigid bushing parts forming a unitary bushing adapted exteriorly to fit the central opening of the table and interiorly to take pipe engaging members, and means rigidly to interconnect the bushing parts directly so that pressures due to spreading forces applied to the bushing parts are not applied to the rotary table, said means comprising a hinge connection between one set of adjacent bushing-part-ends, interengaging formations between another set of adjacent bushing-part-ends, and a removable, downwardly pointing tapered pin closely fitted in complementary, registered pin holes in said interengaging formations.

8. In a rotary table bushing adapted to be moved vertically into and out of the central opening of a rotary table, a plurality of complementary rigid bushing parts forming a unitary bushing adapted exteriorly to fit the central opening of the table and interiorly to take pipe engaging members, and means rigidly to interconnect the bushing parts directly so that pressures due to spreading forces applied to the bushing parts are not applied to the rotary table, said means comprising a hinge connection between one set of adjacent bushing-part-ends, interengaging formations between another set of adjacent bushing-part-ends, a removable, downwardly pointing tapered pin closely fitted in complementary, registered pin holes in said interengaging formations, and means carried by one of the bushing parts and engageable with the pin for forcing it upwardly.

9. In a rotary table bushing adapted to be moved vertically into and out of the central opening of a rotary table, a plurality of complementary rigid bushing parts forming a unitary bushing adapted to exteriorly fit the central opening of the table and interiorly to take pipe engaging members, and means rigidly to interconnect the bushing parts directly so that pressures due to spreading forces applied to the bushing parts are not applied to the rotary table, said means comprising a hinge connection between one set of adjacent bushing-part-ends, interengaging formations between another set of adjacent bushing-part-ends, a removable, downwardly pointing tapered pin closely fitted in complementary, registered pin holes in said interengaging formations, means carried by one of the bushing parts and engageable with the lower end of the pin for forcing it upwardly, and means accessible from the top of said one bushing part for operating said last named means.

10. In a rotary table bushing adapted to be moved vertically into and out of the central opening of a rotary table, a plurality of complementary bushing parts forming a unitary bushing adapted exteriorly to fit the central opening of the table and interiorly to take pipe engaging members, a hinge connection between one set of adjacent bushing-part-ends, a vertically arranged pin connecting another set of adjacent bushing-part-ends and movable upwardly to disconnect said last named ends, and means carried by one of the bushing parts adapted for moving said pin upwardly.

11. In a rotary table bushing adapted to be moved vertically into and out of the central opening of a rotary table, a plurality of complementary bushing parts forming a unitary bushing adapted exteriorly to fit the central opening of the table and interiorly to take pipe engaging members, a hinge connection between one set of adjacent bushing-part-ends, a vertically arranged pin connecting another set of adjacent bushing-part-ends and movable upwardly to disconnect said last named ends, means carried by one of the bushing parts adapted for thrusting said pin upwardly, and means accessible from the top of said one bushing part for operating said last named means.

12. In a rotary table bushing, a plurality of bushing parts forming a unitary bushing adapted exteriorly to fit a rotary table and interiorly to take pipe engaging members, means to interconnect the bushing parts and including a vertically arranged pin connecting adjacent bushing-part-ends and movable upwardly to disconnect said ends, and means for moving said pin upwardly, said means comprising a lever pivoted on one of the bushing parts and being adapted to engage the underside of the pin, and means for pivotally moving the lever in a direction to thrust the pin upwardly.

13. In a rotary table bushing, a plurality of bushing parts forming a unitary bushing adapted exteriorly to fit a rotary table and interiorly to take pipe engaging members, means to interconnect the bushing parts and including a vertically arranged pin connecting adjacent bushing-part-ends and movable upwardly to disconnect said ends, and means for moving said pin upwardly, said means comprising a lever pivoted intermediate its ends on one of the bushing parts, one end of said lever being adapted to engage the underside of the pin, and a push rod extending vertically through the bushing part with its upper end accessible from the top of the part and its lower end engaging the other end of said lever.

14. In a rotary table bushing, a plurality of bushing parts forming a unitary bushing adapted exteriorly to fit a rotary table and interiorly to take pipe engaging members, releasable means for interconnecting the bushing parts, and means on one of the bushing parts adapted for releasing said interconnecting means.

WALTER A. ABEGG.